United States Patent [19]
McGregor

[11] Patent Number: 5,461,769
[45] Date of Patent: Oct. 31, 1995

[54] METHOD OF MANUFACTURING ELECTRICALLY CONDUCTIVE ELEMENTS PARTICULARLY EDM OR ECM ELECTRODES

[75] Inventor: Gavin McGregor, Gloucester, Canada

[73] Assignee: National Research Council of Canada, Ottawa, Canada

[21] Appl. No.: 140,484

[22] Filed: Oct. 25, 1993

[51] Int. Cl.$^6$ ........................................ B22D 25/00
[52] U.S. Cl. .................. 29/527.4; 29/527.2; 219/121.11; 219/121.16; 219/121.17
[58] Field of Search ................... 29/527.2, 527.4; 219/121.11, 121.16, 121.17

[56] References Cited

U.S. PATENT DOCUMENTS 5,189,781  3/1993  Weiss et al. ..................... 29/527.2

Primary Examiner—Carl J. Arbes
Attorney, Agent, or Firm—Juliusz Szereszewski

[57] ABSTRACT

A method of manufacturing electrically conductive elements such as electrodes for EDM, ECM or other electromachining processes comprises the steps of designing a digital representation of the element, making a three-dimensional replica of the element from an intermediate material, e.g. a polymer, based on the digital representation, and coating the replica with a layer of a good electrical conductor. The replica is made using a tool-less prototyping process. The method is faster and less expensive than conventional machining of copper or graphite EDM or ECM electrodes, especially those having an intricate shape.

8 Claims, 3 Drawing Sheets

5,461,769

METHOD OF MANUFACTURING ELECTRICALLY CONDUCTIVE ELEMENTS PARTICULARLY EDM OR ECM ELECTRODES

FIELD OF THE INVENTION

This invention relates to a method of manufacturing electrodes or other electrically conductive elements, and particularly electrodes of complex shape, for example electrodes for metalworking processes such as electrical discharge machining (EDM) and electrochemical machining (ECM).

BACKGROUND OF THE INVENTION

Two most popular electro-machining processes are electrical discharge machining (EDM) and electrochemical machining (ECM). Electrodes for EDM and ECM are themselves usually machined from conductive materials such as copper or graphite. Since the shape of the electrode, or at least of the working (active) portion thereof, must correspond to the geometry of the EDM or ECM-machined part, the electrode manufacturing process can be time consuming depending on the complexity of the shape of the part. Thus far, complex electrodes can take a number of days to manufacture, even using numerically controlled (NC) machines. A review of known techniques for the forming of EDM electrodes is given in a paper by R. Gilmore, EDM Electrode Forming, Society of Manufacturing Engineers, Document MR92-354 (1992), and also in a paper by 0. Rosenholm, Methods of Manufacturing Electrodes, SME Document MR92-350 (1992).

During electrical discharge machining, electrodes are subject to wear. Therefore, electrode life and cost are significant factors in the EDM processes. By comparison, ECM processes do not cause any significant cathode wear since they rely on electrochemical dissolution of the part being machined. However, it is found frequently that the shape of the part produced should be modified and so should be, correspondingly, the cathode. A modification of the cathode could also be necessitated by disturbances in the electrolyte or variations in current density. In such cases, trial and error methods are used to modify or remake the electrodes. Even with the advent of computer aided design, measuring and feedback techniques to assist in effecting the modifications, the electrode machining still requires time, skill and considerable care to carry out, and even the best systems involve several iterations.

SUMMARY OF THE INVENTION

According to the invention, there is provided a method of manufacturing an electrically conductive element, the method comprising the steps of:
  providing a digital representation of at least a working portion of the conductive element,
  forming a three-dimensional solid replica of the element or its portion from the digital representation, and
  applying a layer of electrically conductive material to at least a part of the replica.

In an embodiment of the invention, the replica of the working portion of the element can be attached to a holder before both the working portion and the holder are coated with the electrically conductive layer.

The replicas can be produced by a number of rapid, tool-less prototyping systems. An exemplary prototyping process uses the capability of laser stereolithography to create a three-dimensional solid model of a desired element. It is understandable that the computerized design can make allowance for the thickness of the subsequent electrically conductive (e.g. copper) layer.

The replica is typically made of an intermediate material amenable to a tool-less prototyping method. Preferably, when laser stereolithography is used, the material is a polymer or another non-metallic, and non-conductive material.

The coating can be effected by electroplating, by electroless plating or by other known processes, e.g. spraying or evaporation.

Since the design of the final element is digitized, for example, in a CAD file, it is a simple matter to modify the representation, or design, rather than go through retooling and prototyping process.

DETAILED DESCRIPTION OF THE INVENTION

Figure 1A:
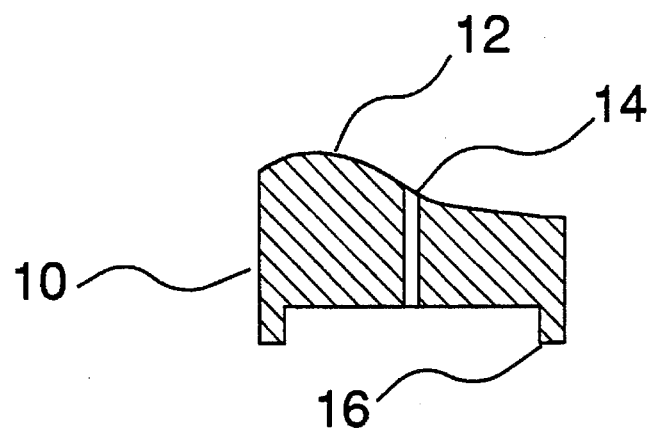
FIG. 1a shows a replica of the working portion of an electrode.

The invention combines certain known steps to arrive at an unexpectedly advantageous result. It is known to produce digital representations of three-dimensional objects as the computer-aided design, or CAD, has been in existence for a number of years; rapid tool-less prototyping methods have recently been developed; and electroplating/electroless plating techniques are also well known. However, the combination of these techniques to arrive at a method for manufacturing electrodes, particularly electro-machining electrodes of complicated shapes, proves to be of significant commercial advantage when the estimated cost of the product of the invention is compared with the cost of existing comparable products. There is a long-felt want for inexpensive ECM and EDM electrodes.

The digitizing of a desired shape, for example the creation of computer aided designs, does not require detailed explanation since the technique is well known.

An exemplary tool-less rapid protyping process, stereolithography, is described for instance by A. J. Lightman, SAE Report 911115, Dayton, Ohio, 1991. A large part of the paper is recited below.

The author states that modern machining is done on numerical control machines which use computerized controllers reading position and other sensors. The 3D CAD programs can generate the numerical control (NC) directives speeding the translation from design to product. Even with these modern advances, the typical time required to go from design to prototype is excessive.

The paper further states that almost all tool-less rapid prototyping technologies, commercial or under development, use the build-by-layer principle. The differences in the machines are in the manner in which the layer information is presented and the range of materials that can be used. Some systems use the build-by-layer approach, while a few use a "free-form" approach.

Regarding the "build-by-layer" approach, the concept is to fabricate the part one layer at a time, attaching each layer produced to those made before. In the end, a layercake approximation to the desired part is produced. Adjusting the layer thickness and the spatial resolution of each layer allows the system to build the approximated part to the desired degree of accuracy.

The layer information is derived from the CAD model. The CAD model, being a 3-D representation, must include descriptions of all the boundary surfaces and this description needs to be in sufficient detail that there are no gaps between joining surfaces. This description is either in the form of a fully surfaced wire-frame model of the part or as a solid model of the part. There are advantages and disadvantages to each of these models and attempts are made to form a hybrid CAD system combining the best features of the two methods. Once the model is formed, it can be oriented in the direction required for fabrication. Most fabrication techniques have preferred directions providing best surface finish or best accuracy (not necessarily the same direction). The computer model is then intersected with the description of a plane in a design space. The resulting intersection provides the slice information for that plane. The plane of intersection is moved from one end of the part to the opposite extreme, in steps compatible with the fabrication technique and the complexity of the part. The steps do not have to be constant; they can be varied within the machine's window of capability, adjusted for accuracy or speed of fabrication depending upon the local requirements. The slice files are used to control the fabrication process, building the part one layer at a time. There are a variety of specialized issues for each process, related to the type of process, the method of fabrication, and the materials used. These need to be considered before selecting a particular technology.

Laser Point-by-Point Fabrication

The most commonly employed technology (generically named stereolithography) fabricates the layers by spot polymerization of a liquid photomonomer due to illumination by a laser (UV or visible). The laser is directed over the surface of a liquid monomer pool (FIG. 2) on a path determined from the layer information. The depth of polymerization depends upon the laser energy deposited in the spot of illumination. This is controlled by moving the laser beam at a speed determined by its spot size and power, and the depth of the slice set by the computer model.

The layer formed on the surface of the liquid must be supported to maintain its position. Also it needs to be tethered so that it does not move laterally, misregistering the subsequent layers. A mechanical platform is often used and the first layer is adhered to this platform. Once the first layer is formed, new liquid photomonomer is introduced above it. This can be accomplished by lowering the platform into the pool a distance corresponding to the thickness of the next layer to be formed or by keeping the platform stationary and raising the level of the pool the required distance. Both methods are used.

Once a fresh layer of liquid of liquid photomonomer is in place, the laser is directed to trace out the description of the next layer. The laser speed is adjusted to polymerize the desired depth plus an additional amount needed to adhere the polymer to the layer beneath. This process is repeated until the final layer is fabricated. The excess liquid is then drained away from the solid, and the solid is cleaned and prepared for use by the designer.

Another technology operates using the same laser build-by-layer basis. In this realization, the laser is used as a heat source sintering the material. The process uses a powder, rather than a liquid, typically a thermoplastic although any material that can be thermally fused is a candidate. The entire energy for the bonding must be delivered by the laser (as opposed to initiating a chemical reaction as in stereolithography). This requires a high-power laser ($CO_2$) even for thin layers of plastics. It does afford the advantage of currently having a greater variety of materials available. Conceivably, this process could be scaled in laser power to work directly with powdered metals providing metal prototypes directly.

Laser Layer-by-Layer Fabrication

The layer-by-layer fabrication technique is a lamination process using the laser to cut out the form of the layer (developed by Helisys, Inc., formerly Hydronetics, Torrance, Calif.). This is an extension of standard lamination methods with the advantage that the fixed die cutter has been replaced with a laser cutter whose outline path can be refigured for each layer. A wide variety of materials can be employed, either roller or stack delivered to the bonding and cutting chamber. Speed is increased since the laser only needs to trace the boundaries of the object instead of the entire solid part of the layer.

Non-Laser Point-by Point Fabrication

The information for the layer description can be imparted by means other than laser. One approach is to deliver the material in a molten or heat-softened form (Stratasys Inc., Minneapolis, Minn.). The heat content is carefully adjusted so that the material will solidify shortly after being delivered, adhering to the form on which it was deposited. The available system uses an extrusion head mounted on a two-axis translation system. The material is delivered to a platform which moves along the direction of the third axis. The system builds up three-dimensional models using a layer-by-layer fabrication technique similar to stereolithography. Current material in use is a wax.

Another approach, similar to the sintering technique, is to bind the particles of powder using an adhesive (E. Sachs et al, "Three Dimensional Printing: Ceramic Tooling and Parts Directly from a CAD Model", Proceedings of the National Conference On Rapid Prototyping, Dayton, Ohio (1990)). In this approach, an ink-jet printer head is used to disperse a binder into a ceramic powder. The powder is written layer-by-layer creating the object. This process has the advantage that it is not restricted to materials that can be sintered. On the other hand, it is restricted to adhesives.

Non-Laser Layer-by-Layer Fabrication

There are several systems being developed to polymerize the photomonomer using a mask to define the exposure pattern (e.g. as described by E. V. Fudim, "Fast Accurate Prototyping by Simultaneous Irradiation of Whole Layers From Constrained Polymer", proceedings of the National Conference On Rapid Prototyping, Dayton, Ohio, 1990). This substitutes an inexpensive UV lamp light source replacing the laser. Lasers are an expensive source of light; difficult to design for ruggedness to meet industrial application standards, their lifetime is short compared with the expected time between failures for machine tools, and they require more maintenance than standard tools. The alternative is to fabricate masks and expose the photomonomer layers through them.

The techniques include writing masks using a xerography process and using liquid crystal light valves for reconfigurable masks. The xerography process requires significant manipulation of the mask plates, cleaning, recoating, and then repositioning it for the next exposure. The liquid crystal light valve can be reconfigured in situ by electronic addressing of its control lines. Materials research is required to design a liquid crystal material that will stand up to prolonged UV exposure.

An interesting innovation in one of these methods, developed by Cubital America Inc, Warren, Mich., is the use of wax to displace the residual liquid photomonomer after each layer is formed. The wax solidifies, supporting the structures fabricated. Consequently, objects can be fabricated anywhere within the working volume of the machine; they do not have to be attached to a binding post.

Free-Form Fabrication

Free-form fabrication is realized by using a material supply head that can be articulated in any direction without the constraint of forming a two-dimensional layer (W. E. Masters, "The Ballistic Particle Manufacturing Process", proceedings of the National Conference as above). The idea is to deposit small droplets on demand. These droplets gel in the time of flight between the delivery head and impact on the form. They adhere to the form and solidify. The part can be built in any desired direction. Also, portions that are not attached from below, such as shaped cantilevered handles, can be built after the attachment point has been built.

Another realization of free-form fabrication is the shaped deposition of molten metal on a mandril (T. E. Doyle, "Shape Melting Technology" proceedings as above) This technique is currently (in 1991, at the time of the print of the Lightman paper) limited to cylindrically symmetric models, but it does allow the direct fabrication of metal parts having full density.

Referring now to the drawings, FIG. 1a shows a replica of the working portion of an ECM electrode. The replica is a generally cylindrical, hollow block 10 of a polyamide with a curved top surface 12. The block 10 has a channel 14 for the supply of electrolyte. It also has a peripheral boss 16 for the purpose of attachment of the block 10 to a holder.

The outer diameter of the block is smaller by about 0.01" than the desired diameter of the ECM electrode to allow for a layer of nickel or copper.

Figure 1B:
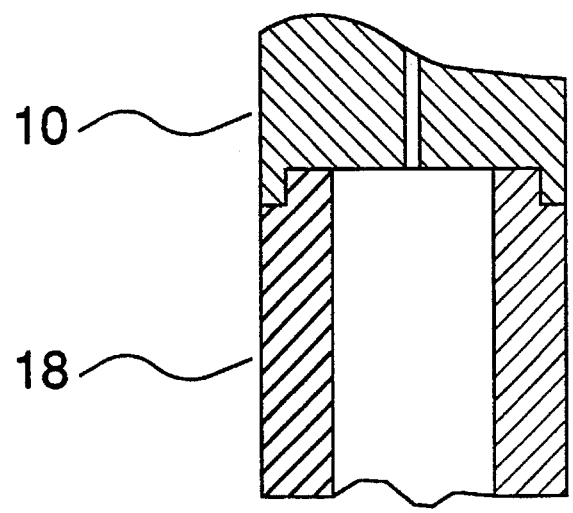
FIG. 1b shows the replica attached to a shank (holder)
Figure 1C:
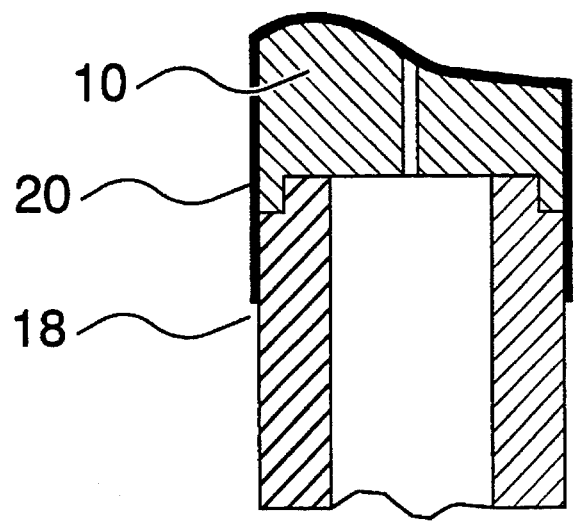
FIG. 1c shows the replica and the shank plated with copper.

It should be noted that it is the outer surface of the replica that must correspond to the shape of the final element (electrode) since the EDM or ECM machining is effected by the outer surface of the electrode; consequently, a significant material saving can be realized according to the invention by designing thin-walled, hollow elements without the need for removing the redundant material by machine-tooling, FIG. 1b illustrates the replica 10 attached to a holder 18 and aligned therewith by way of the boss 16 and a corresponding recess in the holder, and FIG. 1c illustrates the finished electrode with a layer 20 of copper electroplated over the block 10 and a part of the holder 18.

Figure 2:
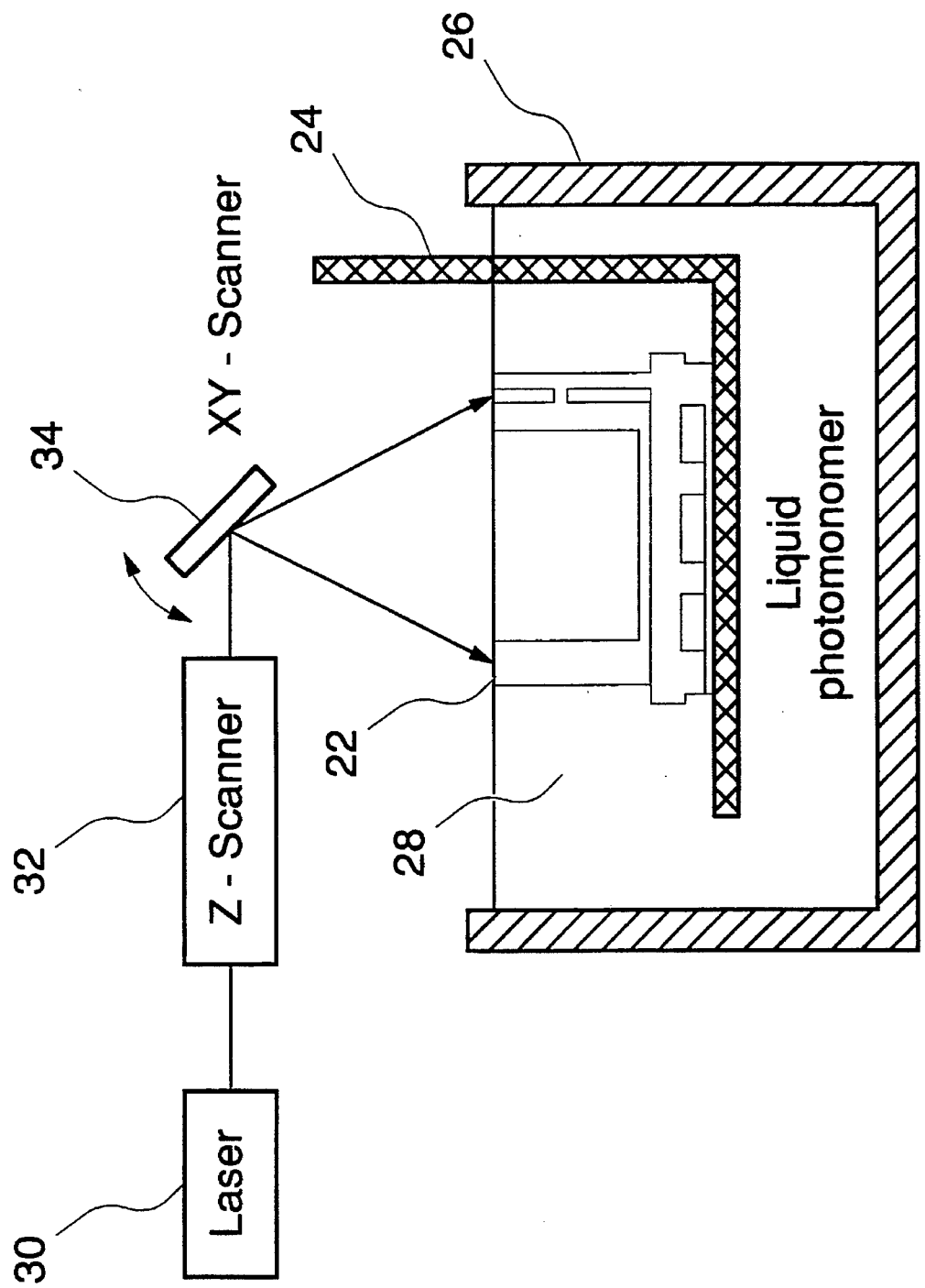
FIG. 2 is a schematic representation of a stereolithographic setup.

An exemplary laser stereolithography process is explained in FIG. 2. A polymerized layered model 22 is positioned on a support platform 24 which is immersed in a tank 26 filled with liquid photomonomer 28. A laser 30 associated with a beam shaping optics and a Z-scanner 32, emits a beam which is directed by a XY scanner 34 onto the surface of the liquid photomonomer 28. The platform 24 is lowered gradually in a vertical direction until the shaping process, involving the laser-induced polymerization of the photomonomer, is complete.

Figure 3A:
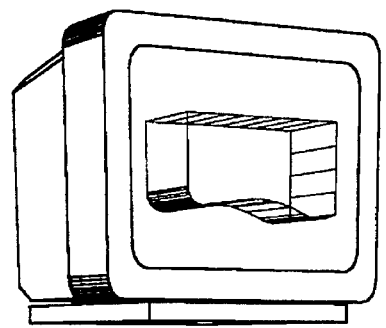
FIGS. 3a thru 3d are a schematic representation of the steps of the present invention, showing an exemplary electrode produced by the method of the invention and a product made therewith.
Figure 3B:
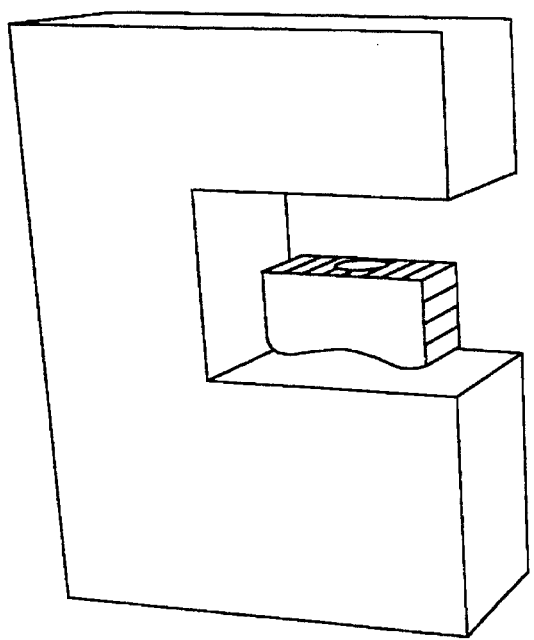
Figure 3C:
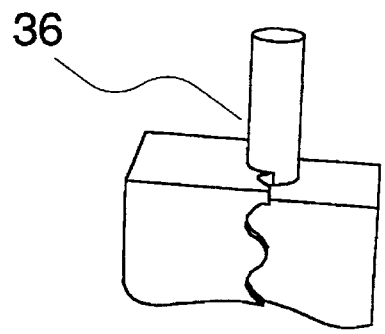
Figure 3D:
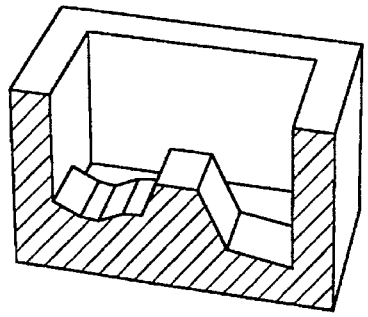

FIGS. 3a–3d illustrates the steps of the invention. Based on a 3-D computer design (FIG. 3a) of an electrode (or another desired conducting element), a polymer model (FIG. 3b) is produced by stereolithography (or another rapid tool-less prototyping method). Subsequently, a tool post 36 is added and the entire model is metal plated to form an electrode (FIG. 3c). Through an electro-machining process such as EDM or ECM, an element of a complicated shape such as a mold (FIG. 3d) can be produced using the electrode (FIG. 3c).

EXAMPLE

A CAD design of an ECM electrode was effected using parametric software (PRO-ENGINEER) operating on a Silicon Graphics computer. A commercially available stereolithography apparatus (SLA), model SLA250 manufactured by 3D Systems Inc., Valencia, Calif. was used. The monomer used in the process, a polyamide precursor, was supplied by DuPont and was compatible with the UV wavelength of the laser built into the SLA system. Copper plating was effected using an electroless plating process following standard practices for metallizing of polymers. Care was taken to ensure the surface of the polymer part was completely cured and thoroughly clean prior to plating. The plating thickness was 0.005 inches. An allowance was made in the design to compensate for the extra thickness.

It is important to note that the intermediate material used in the tool-less prototyping step, can be a metal, as explained in the Lightman reference, above. However, the metallic replica may be made of a poor electrical conductor such as lead or zinc and may still require plating with copper or another material with a good electric conductivity. Generally, the most convenient materials to use in the tool-less prototyping step are polymers which do require subsequent coating, or partial coating, with a layer of a good electrical conductor.

The time to build the polymer component of the electrode will vary with size. Most electrodes within the size range of EDM machines can be built overnight as the SLA system can run unattended. Large electrodes may take as much as a day of continuous building. In the case of smaller electrodes, several pieces can be made in a batch.

It is an advantage of the invention that flushing holes, which are a fundamental requirement of the EDM process for complex geometries, can be built directly into the part by the SLA. The subsequent plating process does not block the holes.

It is also an advantage of the invention that alignment devices, such as a suitable shank to fit the collet in a EDM machine, can be added as a feature of the design. A metal shank may be added after the polymer has cured and prior to copper plating. The shank is also plated to ensure uniform conductivity. Metal shanks are most likely required for electrodes with large surface areas in order to carry the higher currents, and this is also true in the case of ECM cathodes. Heavier copper plates may be necessary in the case of large electrodes for ECM which are required to carry high current densities, and the limitations can be calculated readily based on Ohm's laws.

I claim:

1. A method for manufacturing an electrode, the method comprising the steps of:
   a) providing a digital representation of at least a working portion of the electrode,
   b) forming a three-dimensional solid replica of the at least working portion of the electrode from, or based on, the digital representation, and
   c) coating at least a part of the replica with a uniform, non-detachable layer of electrically conductive material, the shape of the outer surface of the conductive material being substantially a positive of the shape of the corresponding underlying part of the replica, to produce an electrode wherein the non-detachable conductive layer is integral with the underlying solid replica.

2. The method according to claim 1 wherein the solid replica is formed by tool-less prototyping.

3. The method according to claim 2 wherein the solid replica is formed by laser stereolithography.

4. The method according to claim 1 wherein the digital representation includes an allowance for the thickness of the electrically conductive layer.

5. The method according to claim 1 wherein a replica of at least a working portion of the conductive element is attached to a holder prior to step c).

6. The method according to claim 1 wherein the replica is of an intermediate material.

7. The method according to claim 6 wherein the intermediate material is a polymer.

8. The method according to claim 1 wherein the step c) is carried out by electroplating.

* * * * *